United States Patent [19]

Hirane

[11] Patent Number: 5,120,924
[45] Date of Patent: Jun. 9, 1992

[54] WELDING METHOD FOR COATED METAL ARTICLES

[76] Inventor: Akio Hirane, 1-16-26, Midorigaoka, Meguro-ku, Tokyo, Japan

[21] Appl. No.: 662,013

[22] Filed: Feb. 28, 1991

[30] Foreign Application Priority Data

May 16, 1990 [JP] Japan .................................. 2-51140
Oct. 23, 1990 [JP] Japan .................................. 2-285482

[51] Int. Cl.⁵ ..................... B23K 11/11; B23K 11/16
[52] U.S. Cl. ................................. 219/118; 219/86.21; 219/108
[58] Field of Search ............... 219/86.21, 108, 117.1, 219/86.9, 90, 87, 118

[56] References Cited

U.S. PATENT DOCUMENTS

| Re. 29,762 | 9/1978 | Becker | 219/90 |
| 3,462,577 | 8/1969 | Helms et al. | 219/108 |
| 3,510,623 | 5/1970 | Wolgast | 219/86.21 |
| 4,419,557 | 12/1983 | Gellatly | 219/117.1 |
| 4,908,938 | 3/1990 | Thorwarth et al. | 219/86.21 |

*Primary Examiner*—Clifford C. Shaw
*Attorney, Agent, or Firm*—Allegretti & Witcoff

[57] ABSTRACT

A method for spot welding metal articles having coatings on the surfaces thereof in which the coating on the outer surface of one of the articles is removed by heating the article as a resistance in an electric circuit. This is done using low amperage current. When the coating is removed, the current can flow freely between the electrodes at high current to effect a secure weld without sparking, distortion or boring of the articles.

1 Claim, 3 Drawing Sheets

WELDING METHOD FOR COATED METAL ARTICLES

This invention relates to a spot welder for carrying out method of metal articles, sheets and the like having a coating on their surfaces.

THE PRIOR ART AND THE PROBLEMS THEREOF

FIG. 4 described below, illustrates a conventional spot welder. In FIG. 4, reference numeral 2 designates a substantially rectangular shaped welder body, which is pivoted at its lower portions with pairs of left and right large and small wheels 4 and 6 so that the welder body may be moved according to the work conditions.

Externally of the welder body 2 are provided a main switch 8 for turning on and off a power source for the whole welder and adjusting knobs 10 and 12 for adjusting welding current values, welding time and the like.

The welder body 2 is interiorly provided with a welding power source (not shown) comprising a transformer and a rectifier which produces a DC low voltage and a large current. An output side of the welding power source is provided with a plus side terminal (not shown) and a minus side terminal (not shown).

A distal end of the plus side cable 14 is electrically connected to the plus side terminal on the output side of the welding power source, the plus side cable 14 being drawn outside from the front side of the welder body 2. A tip holder 16 is mounted on the extreme end of the plus side cable 14, and a welding tip 18 is mounted on the extreme end of the tip holder 16.

A distal end of the minus side cable 20 is connected to the minus side terminal on the output side of the welding power source, the minus side cable 20 being drawn out from the front side of the welder body 2.

An example of the case where one-side spot welding is applied to articles 24 and 26 by use of this spot welder will be described below.

First, a flat plate 22 connected to ground is mounted on the extreme end of the minus side cable 20 drawn out from the front side of the welder body 2.

Then the opposed surfaces of the articles to be welded 24 and 26 are partly abraded or ground by a sander or the like so that the conductivity of areas in contact is improved. The articles to be welded 24 and 26 are then stacked.

Next, the minus side cable 20 is connected to ground and the ground plate 22 at the extreme end of the minus side cable 20 is secured to the lower article 24 to be welded by means of a clamp 28 in electrically connecting relation.

Welding current value (about 50 A) and welding time (0.3 to 0.4 second) are set by adjusting knobs 10 and 12. The main switch 8 of the welder body 2 is turned on and the extreme end of the welding tip 18 on the output side is pressed against a spot 30 of the article 26 to be welded.

A large highly concentrated current flows into the spot 30 (portions against which the welding tip 18 is pressed) of the articles 24 and 26 to apply one-side spot welding between said articles 24 and 26.

However, the conventional spot welder has a problem in that when the spot 30 against which the welding tip 18 is pressed is spaced from the part with which the ground plate 22 is placed in close contact, the voltage drop increases and the current flowing into the spot, against which the welding tip 18 is pressed, decreases, sometimes resulting in an incomplete welding. Therefore, heretofore, in welding such a spot as described above, the welding time is extended. When the welding time is extended, the working efficiency is lowered and a large amount of heat is generated in the area surrounding the spot which anneals the metal. As a result, the strength of the articles 24 and 26 to be welded is lowered and, in addition, said articles become deformed.

Next, an example of the case where both-side spot welding is applied, by use of the conventional spot welder, to two overlapped iron plates (articles to be welded) which are coated over the entire surfaces thereof will be described below.

First, a tip holder (not shown) and a welding tip (not shown) are mounted at the extreme end of the minus side cable 20 drawn out from the front side of the welder body 2.

Then, parts of the front and back surfaces of the two iron plates are respectively abraded or ground by use of a sander or the like to remove the coating on the surfaces of said parts, and these two iron plates are laid one upon the other in such a manner that the thus ground parts overlap each other; and a both-side spot welding is applied to these ground parts to become electrically conductive.

The welding tip has thus been heated to become hot through this welding, so that the both-side spot welding is carried out, melting and destroying the coating by this hot welding tip.

In case the coating is too firm or stubborn to perform the welding, the coating is destroyed by swinging the spot gun right and left in a gouging manner, whereby the both-side welding is effectuated.

This conventional both-side spot welder is advantageous in that both side spot welding can be applied to two iron plates coated over the entire surfaces thereof in a short period of time.

However, in case of this conventional both-side spot welder, spot welding is effected in such a manner that a large amount of electric current is made to flow in almost continuous state to heat the welding tip forcibly, so that, if the receiving end circuit breaker or fuse is of a small capacity, it is liable to blow; and thus a receiving circuit breaker or fuse of a large capacity must be used.

Furthermore, in case of this conventional both-side spot welder, a large amount of current is applied almost continuously so that the cable, the transformer, the diodes and other parts heat, as a result of which the service factors thereof fall, and in addition, due to this heat, the welder body is deteriorated so that the useful life of the welder body is shortened.

Moreover, in case of spot welding iron plates by use of this conventional both-side spot welder, when the coating is destroyed by the welding tip, sparks are caused at the extreme end of the welding tip to bore a hole in the iron plates or, due to the heat of the sparks, the material quality of the iron plates is changed, as a result of which the strength of the spot weld is weakened, or the extreme end of the welding tip is worn away in a short period of time.

Besides, among the conventional both-side spot welders, there is a type of welder in which a spot gun and a transformer are arranged in one integral structure. In case of this type of welder, the operator must quickly perform the welding work by carrying the whole of the heavy welder with his hands, before the welding tip gets cooled; and thus the operator becomes very tired.

SUMMARY OF THE INVENTION

The object of this invention is to obviate the aforementioned problems. A further object of the invention is to provide a spot welder which can apply a good one-side or two-side method for spot welding in a short period of time without producing annealing or deformation in the vicinity of a spot to be welded; and in which a receiving side circuit breaker or fuse of a small capacity can be used, the useful life of the main body is long, and it is ensured that the articles to be welded are prevented from being bored during welding, the strength of the spot weld is prevented from being weakened by the sparking heat, and the extreme end of the welding tip is prevented from being worn away in a short period of time; also to provide a welding method for using said spot welder.

The method according to this invention utilizes a welding power source for generating a low voltage and a large current and having a plurality of output cables connected to generator terminals on the output side of said welding power source. At least two output side cables are connected to one generator terminal.

In addition, for achieving the aforesaid objects, the welding method using the aforementioned spot welder having the contacting surfaces of the overlapped articles to remove the coating in the area to be welded, electrically connecting at least one of said three or more output side cables to one of the overlapped articles to be welded, interposing the parts of said articles to be welded between a welding tip connected to a second of said output side cables and another welding tip connected to a third of said output side cables and applying a current under this state.

By using the method according to this invention, any coating or the like on the outer surface of the article to be welded is also removed and the metal exposed. Thus, the welding electrode is in good electrical contact with the exposed metal so that a large current flows in a short period of time.

THE DRAWINGS

DETAILED DESCRIPTION

Preferred embodiments of this invention will be described hereinafter in detail with reference to the accompanying drawings.

Figure 1:
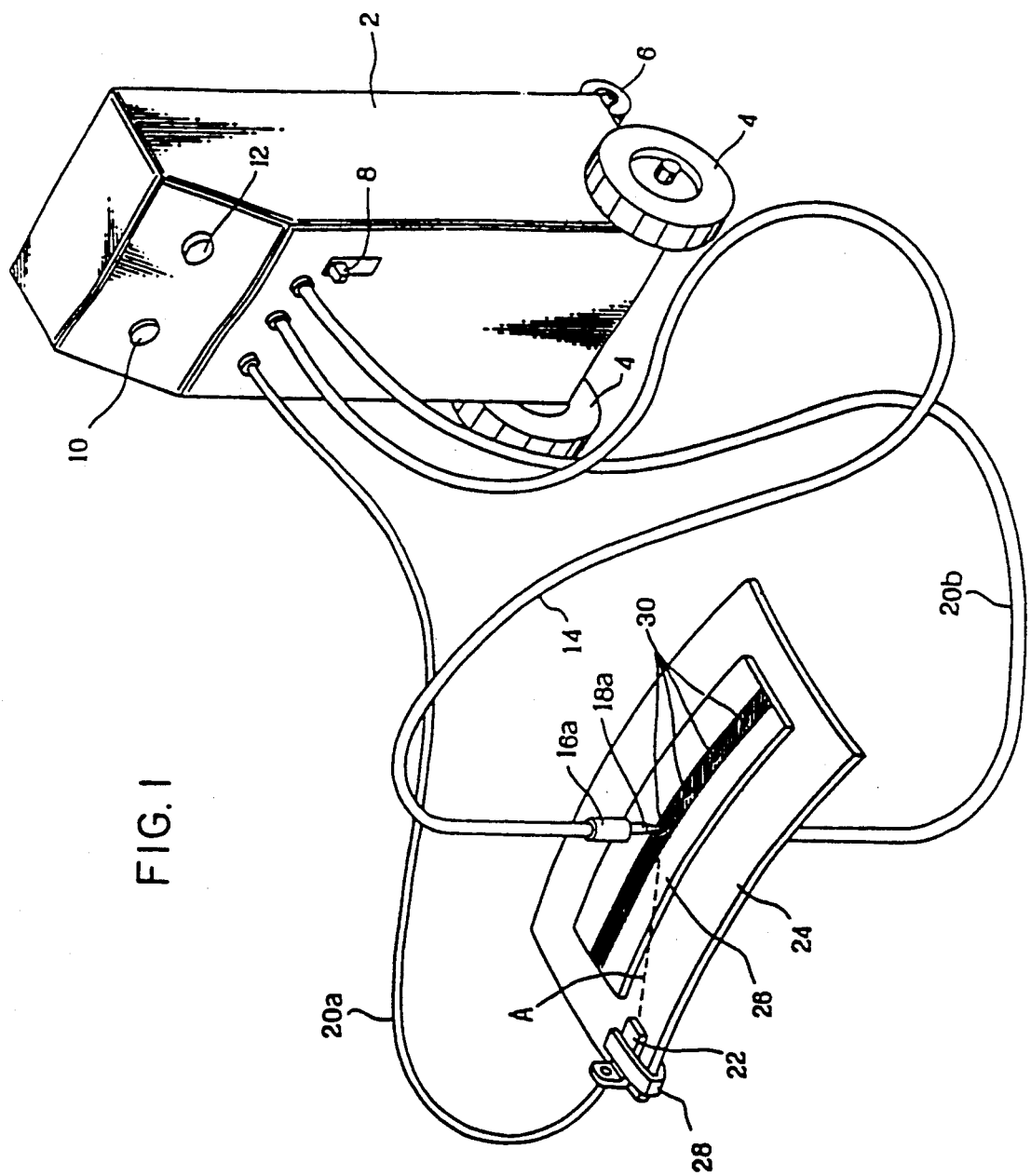
FIG. 1 is a perspective view of a spot welding apparatus constructed in accordance with the invention connected to superimposed parts to be spot welded.

In FIG. 1, reference numeral 2 designates a substantially rectangular shaped welder body, which is provided at its lower portions with pairs of left and right large and small wheels 4 and 6 so that the welder body may be moved according to the work conditions.

Externally of the welding body 2 are provided a main switch 8 for turning on and off a power source for the whole welder and adjusting knobs 10 and 12 for adjusting welding current values, welding time and the like.

The welder body 2 is interiorly provided with a welding power source (not shown) comprising a transformer and a rectifier which produces a DC low voltage and a large current. The output side of the welding power source is provided with a plus side terminal (not shown) and a minus side terminal (not shown).

The distal end of the plus side cable 14 connects to the plus side terminal on the output side of the welding power source, the plus side cable 14 being drawn out from the front side of the welder body 2. A tip holder 16a is mounted on the extreme end of the plus side cable 14 and a welding electrode tip 18a is mounted on the extreme end of the electrode holder 16a.

Distal ends of two minus side cables 20a and 20b connect to the minus side terminal on the output side of the welding power source, the minus side cables 20a and 20b being drawn out from the front side of the welder body 2.

Figure 2:
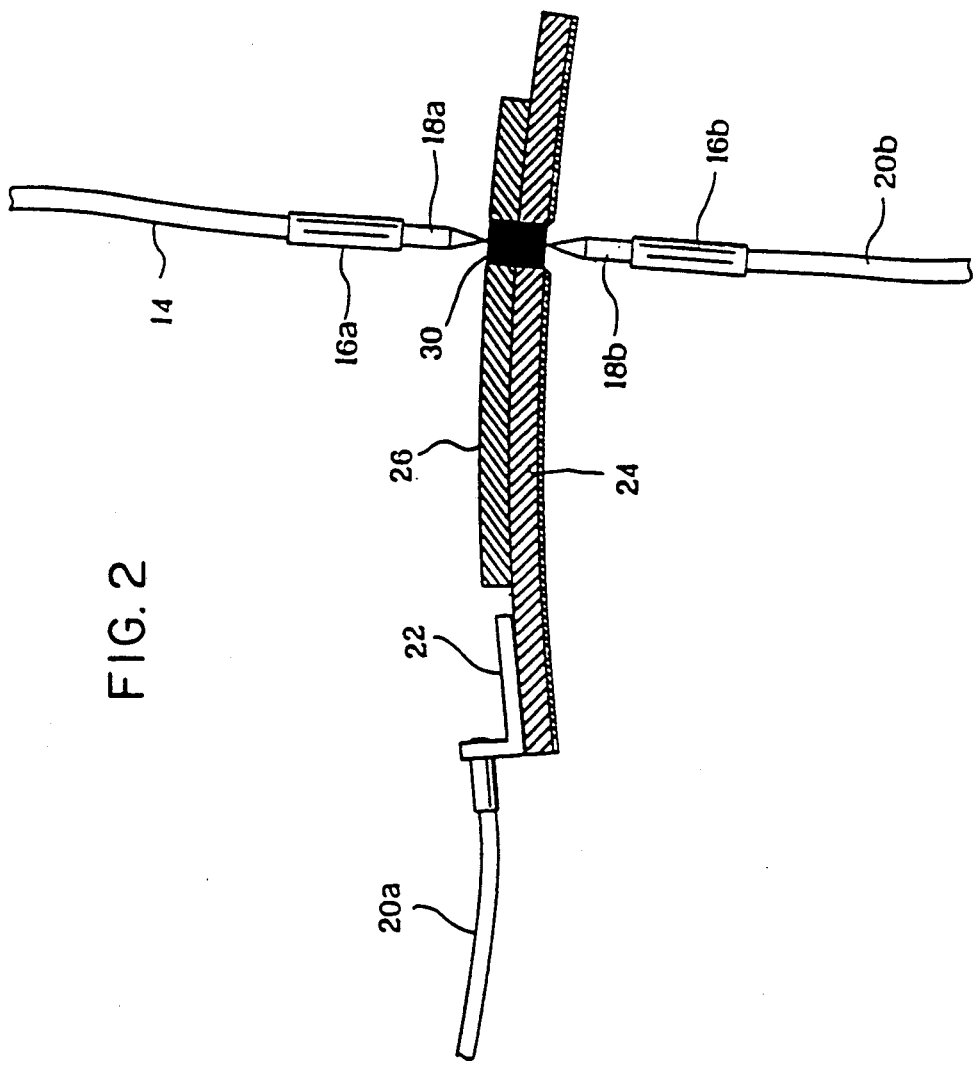
FIG. 2 is a sectional view through said superimposed parts connected to the apparatus shown in FIG. 1.

FIG. 2 is a sectional view of essential parts of this invention. As shown in FIG. 2, ground plate 22 is mounted on the extreme end of one minus side cable 20a out of the minus side cables 20a and 20b. A welding electrode tip 18b is mounted on the extreme end of the other minus side cable 20b through the electrode holder 16b.

In using the apparatus, opposed surfaces of the articles 24 and 26 to be welded are ground by a sander or the like so that the surfaces in the area of the weld are made electrically conductive. Articles 24 and 26 are placed one above the other with the abraded areas in contact.

An elongated strip (indicated by the diagonal lines in FIG. 1), in the area of the spots 30 on the outer surface of the upper article to be welded is ground by a sander or the like to expose the metal surface to improve the electrical conductivity.

Next, the ground plate 22, attached to the extreme end of the minus side cable 20a, is placed in close contact with a predetermined position of the lower article 24 to be welded by means of a clamp 28.

As shown in FIG. 2, a spot 30 to be welded of said articles 24 and 26 is interposed between the welding electrode 18b connected to the other minus side cable 20b and the welding electrode 18a connected to the plus side cable 14.

Subsequently, welding current value and welding time (0.3 to 0.4 second) are set by adjusting knobs 10 and 12, and the main switch 8 of the welder body 2 is turned on to apply current.

With the arrangement as described above, the spot 30 to be welded is heated by the current flowing between the ground plate 22 connected to said article 24 and the spot 30 to be welded, as indicated by the broken line A in FIG. 1 and any coating or the like on the outer surface of said part is removed, and the metal surface is exposed.

In this state, the resistance between the welding tip 18a and the welding tip 18b is less than the resistance between the welding tip 18a and the ground plate 22. For this reason, a large current flows between the welding tip 18a and the welding tip 18b in a short period of time to obtain a rigid spot welded area.

Next, the welding current value and a welding time (0.3 to 0.4 second) are set by adjusting knobs 10 and 12 of the welder body 2. The main switch 8 is turned on, and the extreme end of the welding tip 18 is pressed against the spot 30 to be welded. A large concentrated current flows into the spot 30 against which the welding tip 18 is pressed for a predetermined period of time and said articles 24 and 26 are heated and welded at the spot 30.

Figure 3:
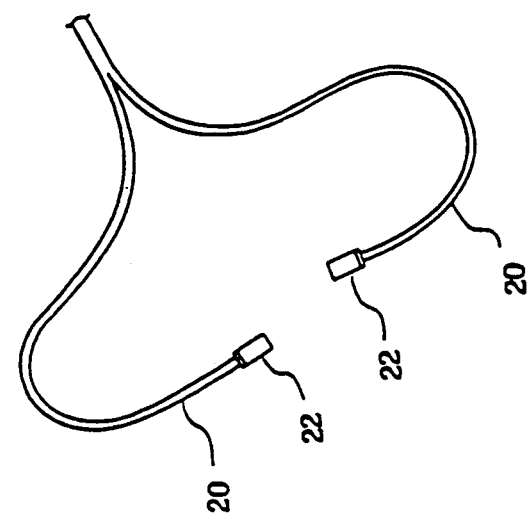
FIG. 3 is a perspective view of a minus side cable according to another embodiment of the invention.

Since the current flow is branched from spot 30 to both ground plates 22 as indicated by the broken lines A and B in FIG. 3, less heat is generated in the area of the spot 30 to be welded which avoids any lowering of the strength and also deformation due to the deterioration of the metal being welded.

Figure 4:
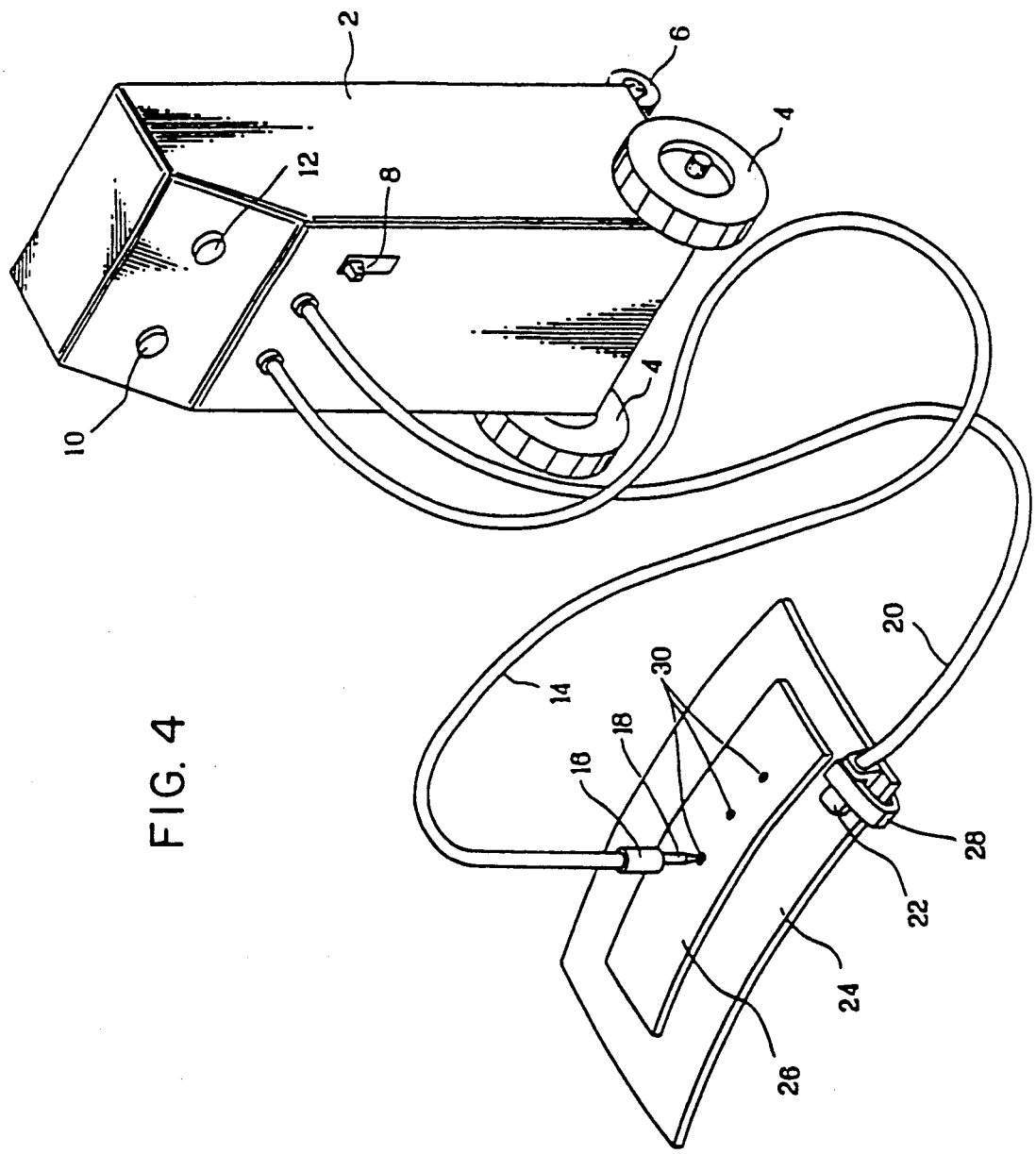
FIG. 4 is a perspective view of a spot welding apparatus illustrative of the prior art.

While in the above-described welder, two minus side cables 20a and 20b are directly drawn out of the welder body 2, it is to be noted, as shown in FIG. 4, one minus side cable 20 may be drawn out of the welder body 2, and the cable may be branched into two or more in number.

In the above-described embodiment, the minus side cable has been fixed to the ground side of the article to be welded. It is to be noted, of course, that a similar effect may be obtained by fixing them in reverse order.

It will be understood by those skilled in the art that, while a transformer and rectifier has been described as power supply to obtain DC output power, the present invention can also be used with an AC power supply.

According to this invention, when a current is applied to articles to be welded, the coating or the like on the back of said articles at the spot to be welded is removed by heated generated by the current which first flows from the plus side electrode to the side cable ground thereby reducing the resistance. The removing of the coating or outer surface of the spot to be welded is attributable to the fact that the heat burns away said coating. Then, a large current flows into the spot of low resistance from the welding electrode connected to the minus side cable to the welding electrode connected to the minus side cable in a short period of time. Therefore, a rigid welding can be produced without causing deterioration or deformation of the article to be welded due to generation of heat.

Moreover, according to this invention, since the diameter of the ground side cable can be reduced, the ground side cable can be moved easily, thus providing efficient operation of the welding apparatus.

The breaker on the receiving side has about 30 A a capacity which is sufficient under the three three cable system according to the present invention.

Moreover, since, according to the present invention, the coating on the back or outer surface of the article to be welded is removed by burning, as described above, both-side spot welding can be performed without removing by abrading or grinding the coating on a part (spot) of the back sides of articles to be welded which (part) is not manually accessible.

Furthermore, since, according to the present invention, the coating on the back of the spot to be welded is removed by the heat due to the current flowing between the ground cable and one welding tip, there is no necessity of applying a large amount of current to the welding tip to heat the welding tip forcibly; and therefore, the receiving side circuit breaker or fuse can be made small in capacity, and the useful life of the welder body can be lengthened.

Besides, according to the present invention, a current flows between one welding tip and the ground cable and one welding tip at the early stage of welding, so that sparks are reduced; and therefore, the articles to be welded are prevented from being bored, the strength of the spot weld is prevented from being weakened due to heat, or the extreme end of the welding tip is prevented from being worn away in a short period of time.

What is claimed is:

1. A welding method using a spot welder comprising a welding power source which generates high current at low voltage, at least three output cables leading from terminals $T_1$, $T_2$ and $T_3$ in said power source to the work to be welded, said method comprising providing upper and lower coated articles to be welded in overlapped position, abrading the opposed surfaces of said articles in the area to be spot welded to remove the coating, bringing said articles into overlapped position with said opposed abraded surfaces in contact with each other, electrically connecting at least one of said cables, leading to ground ($T_1$) or to the terminal ($T_2$) of one polarity of the power source, to one of said articles, interposing said overlapped articles between a pair of welding electrodes in contact with the outer surfaces of said articles and connected to the outer ends of cables, one leading to one terminal $T_2$ of the power source and the other leading to the other terminal $T_3$ of the power source, applying a first current flow from the electrode connected to terminal $T_2$ to at least one cable connected on one end to one of the articles to be welded and on the other end either to terminal $T_1$ or $T_3$, whereby the coating on the outer surface of said lower article at the spot to be welded is removed by burning so that the electrode in contact with said surface is in good electrical contact with said surface, and applying a second larger current flow from the welding electrode connected to terminal $T_2$ to the welding electrode connected to terminal $T_3$, whereby a rigid welding is produced between said articles.

* * * * *